United States Patent

[11] 3,588,897

| [72] | Inventor | Thomas G. Konrad<br>Silver Spring, Md. |
|---|---|---|
| [21] | Appl. No. | 838,925 |
| [22] | Filed | July 3, 1969 |
| [45] | Patented | June 28, 1971 |
| [73] | Assignee | The United States of America as represented by the Secretary of the Navy |

[54] METHOD AND APPARATUS FOR THE SIMULTANEOUS PROBING OF THE ATMOSPHERE BY RADAR AND METEOROLOGICAL SENSORS
10 Claims, 4 Drawing Figs.

| [52] | U.S. Cl. | 343/6, 343/5, 343/7.3 |
|---|---|---|
| [51] | Int. Cl. | G01s 9/14, G01w 1/08 |
| [50] | Field of Search | 343/5 (W), 6, 7.3 |

[56] References Cited
UNITED STATES PATENTS

| 2,958,829 | 11/1960 | Hay | 343/6UX |
|---|---|---|---|
| 3,341,844 | 9/1967 | Sweeney | 343/5(W) |
| 3,448,613 | 6/1969 | Kastner et al. | 343/5(W)X |
| 3,508,259 | 4/1970 | Andrews | 343/6 |

Primary Examiner—Rodney D. Bennett, Jr.
Assistant Examiner—T. H. Tubbesing
Attorneys—Justin P. Dunlavey and John O. Tresansky ABSTRACT: Meteorological sensing equipment is mounted aboard an aircraft to sample the atmosphere during flight. The aircraft is then tracked with an automatic tracking gate while sampling the radar return from the atmosphere with a data gate placed just ahead of or behind the tracking gate; i.e., the aircraft, in time or equivalently, in range. The position of the aircraft in space is recorded and, by using the known time offset between the tracking and data gates, the position of the atmospheric volume sampled by the radar is also known both relative to the aircraft (meteorological sensors) and in absolute terms as a function of time, regardless of aircraft pattern or flight path.

INVENTOR
THOMAS G. KONRAD

BY

J. O. Tresansky
ATTORNEY

INVENTOR
THOMAS G. KONRAD

METHOD AND APPARATUS FOR THE SIMULTANEOUS PROBING OF THE ATMOSPHERE BY RADAR AND METEOROLOGICAL SENSORS

BACKGROUND OF THE INVENTION

The radar returns from visually clear air have been the subject of study for some time. Moreover, aircraft equipped with meteorological sensing equipment have probed the regions producing the clear air radar returns. In the past, however, these two probes; i.e., the radar and the aircraft, have been used rather independently of one another. Also, problems arise when one attempts to make a comparison between the radar signal received from a volume of space and the measurement of an atmospheric property, such as refractive index, by a probe mounted on an airplane or balloon, etc. Inasmuch as the atmosphere is continually changing in space and time, accurate comparisons of the radar returns and meteorological results require coincidence in the volume sampled and the time of sampling. The present invention overcomes these problems by enabling the atmosphere to be essentially simultaneously sampled by radar and the aircraft-borne meteorological sensors.

SUMMARY OF THE INVENTION

Stated simple, the present invention proposes a method and apparatus whereby the aircraft is tracked by radar with an automatic tracking gate while at the same time sampling the radar return using a data gate placed just ahead of or behind the aircraft in time. The position of the aircraft (the tracking gate) is then recorded in terms of azimuth, elevation and range, and inasmuch as the data gate is offset in time by a known interval from the tracking gate, the position of the atmospheric volume being sampled by the radar (data gate) is also known relative to the aircraft and in absolute terms, as a function of time for any aircraft flight pattern. Therefore, an investigator can readily correlate the atmospheric radar returns and the airborne meteorological measurements for any atmospheric region of interest. Preferably, the time offset between the data and tracking gates is selected such that the aircraft does not itself contribute to the radar signal recorded within the data gate.

In view of the above, one object of the present invention is to provide a method and apparatus enabling the substantially simultaneous sampling of the atmosphere by radar and meteorological sensors.

Another object of the present invention is to provide a method and apparatus for simultaneously sampling the atmosphere with radar and aircraft-carried meteorological sensors wherein the aircraft is tracked by an automatic radar tracking gate and the atmospheric radar return is sampled by a data gate offset from the tracking by a known time interval.

A further object of the present invention is to provide a method and apparatus capable of permitting the essentially simultaneous sampling of an atmospheric volume by radar and airborne meteorological sensing equipment, wherein the aircraft carrying the meteorological sensing equipment does not itself contribute to the radar signal returns.

Other objects, purposes and characteristic features of the present invention will in part be pointed out as the description of the present invention progresses and in part be obvious from the accompanying drawings wherein.

Figure 1:
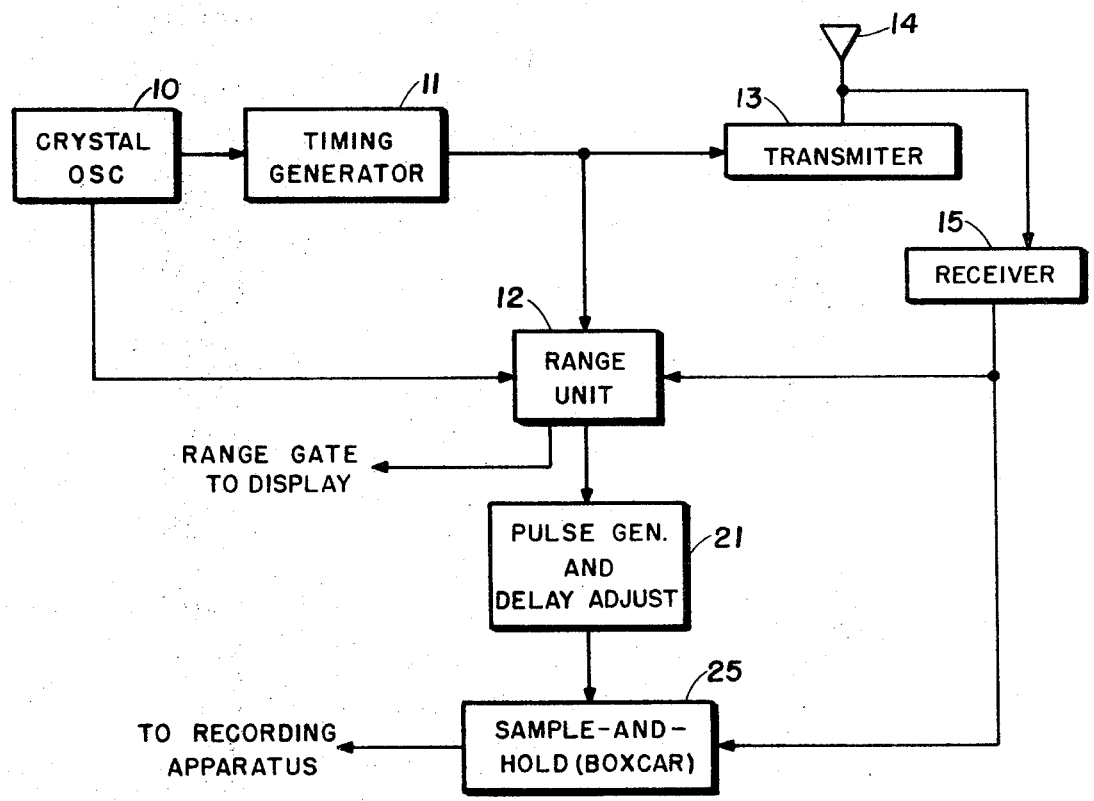
FIG. 1 is a block diagram illustrating a radar system embodying the method and apparatus of the present invention.

Referring now to the drawings, FIG. 1 is a generalized block diagram illustrating the adaptability of the present invention to many radar systems. More specifically, in accordance with conventional radar practice, precision crystal oscillator 10 supplies its output frequency as input to a timing generator 11 and range unit 12. The timing generator 11, in turn, produces the so-called master radar trigger pulses, at the pulse repetition frequency of the radar and applies them to the transmitter unit 13 and the range unit 12. These master trigger pulses are effective to cause antenna 14 to radiate pulses of electromagnetic energy towards an aircraft or balloon, etc., containing suitable meteorological sensing equipment such as, for example, microwave refractometers, hot wire anemometers and hot wire temperature probes, etc.

The radiated electromagnetic pulses are reflected both by the aircraft (or balloon) carrying the meteorological equipment and by the atmosphere. The resulting radar returns are received at unit 15 in FIG. 1 and converted into a video output signal which is applied, on the one hand, to the range unit 12. In accordance with well-known radar techniques, the range unit 12 responds to the video input signal representing the target aircraft and generates a range tracking gate effective to cause the radar to automatically track the aircraft in a conventional manner.

Figure 2:
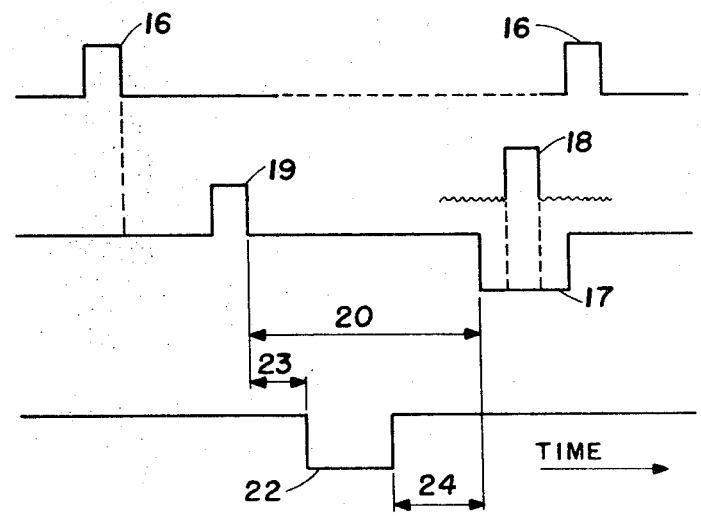
FIG. 2 illustrates various timing signals employed in the embodiment of the present invention illustrated in FIG. 1.

Referring now to the timing diagram of FIG. 2, the master radar trigger pulses are illustrated at 16; whereas the range tracking gate developed by range unit 12 is illustrated at 17, with the radar return 18 from the target aircraft centered on the range tracking gate 17. As it is well-known to those skilled in the art, a prerange trigger pulse 19 is commonly generated in the range unit 12 a fixed time interval 20 ahead of the range gate 17.

In accordance with the present invention, this prerange trigger pulse 19 is applied to a pulse generator 21, in FIG. 1, having an adjustable delay. The pulse generator unit 21 may be of any number of well-known designs capable of producing a data gate pulse 22 (see FIG. 2) which is delayed by a predetermined and variable amount 23 from the prerange trigger pulse 19 and thus is offset, in time, from the range tracking gate 17 by a known time interval 24. This data gate 22 is applied to and controls the operation of a standard sample and hold (boxcar) circuit 25 which also receives the video output signal from the radar receiver unit 15. As a result, the boxcar circuit 25 continually samples the radar returns from a volume of atmosphere displaced, in time (or range), from the tracking gate 17 and therefore the aircraft. The video information contained within the sample and hold circuit 25 is monitored by suitable recording apparatus (not shown).

Figure 3:
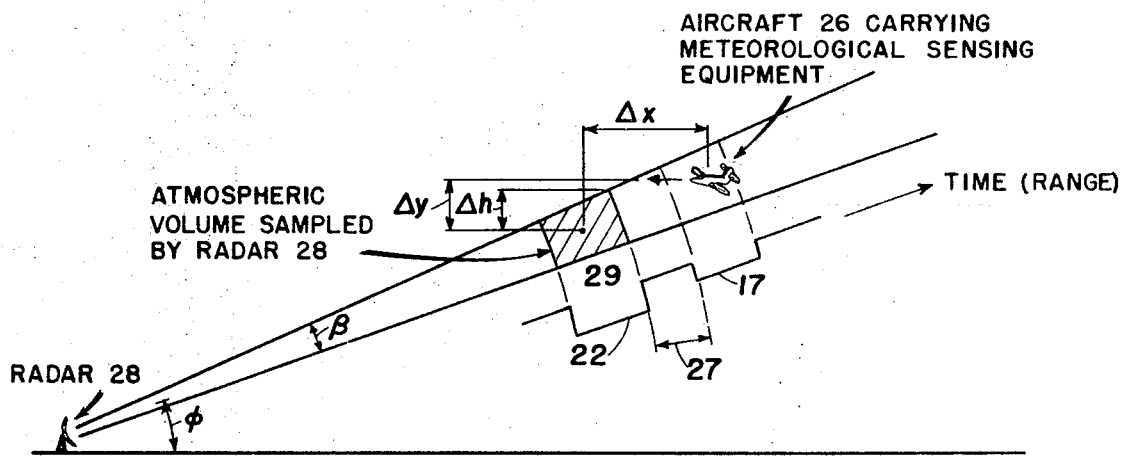
FIG. 3 is a pictorial illustration of one mode of operation for the present invention wherein the data gate is offset ahead of the tracking gate in time.

As mentioned previously, the method and apparatus of the present invention is capable of operating in either of two modes; one (the early gate mode) wherein the data gate 22 generated by the radar 28, as previously described, is placed just ahead of the aircraft in time and the other (the late gate mode) wherein the data gate 22 is placed just behind the aircraft in time. Considering first the early data gate mode illustrated in FIG. 3, the data gate 22 is positioned slightly ahead of the tracking gate 17, in time, with a predetermined safety factor 27 to insure that the target aircraft 26 does not contaminate the atmospheric radar data. The safety factor 27 may, for example, be provided by the variable delay capabilities of the pulse generator unit 21 in FIG. 1. In this early data gate mode, the data gate 22 would be sampling the atmosphere either in front of or behind the aircraft 26 depending respectively upon whether the aircraft 26 is flying towards or away from the radar 28. If, for example, it is assumed that the aircraft 26 is flying a substantially radial course relative to the radar unit 28, as illustrated in FIG. 3, the atmospheric volume 29 being sampled by the radar 28 is ahead of and slightly below the aircraft 26 on an inbound leg; whereas, during an outbound leg, in the early data gate mode of FIG. 3, the sampled atmospheric volume would be behind and slightly below the aircraft 26. In the latter case, the possibility would arise that downwash from the aircraft 26 might disturb the radar sampled volume.

Figure 4:
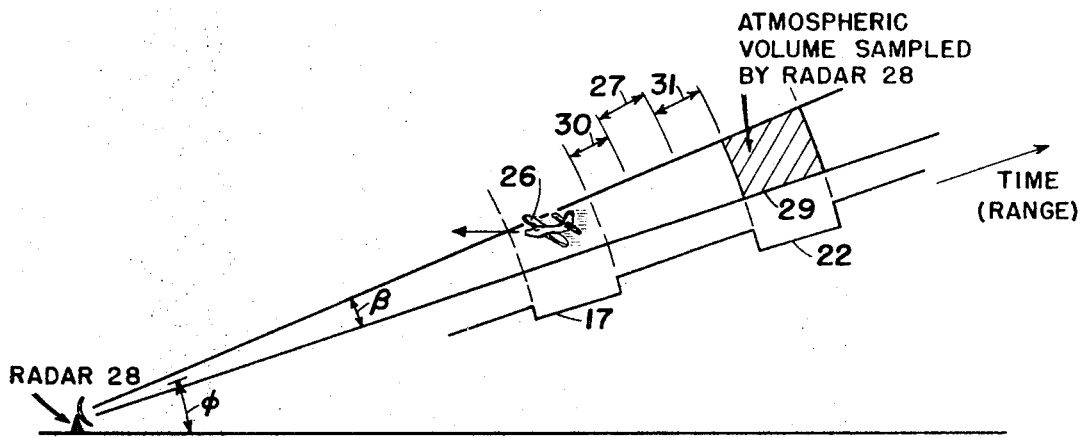
FIG. 4 is a pictorial illustration of a second mode of operation for the present invention wherein the data gate is offset behind the aircraft tracking gate in time.

In FIG. 4 of the drawings, the data gate 22 is placed behind the tracking gate 17 in time. In this late data gate mode of operation, the radar 28 will sample undisturbed air for both inbound and outbound legs. However, in the case of very sensitive radars, the aircraft 26 may, in the late data gate mode, present such a large target that the radar receiver apparatus will saturate. Consequently, it may be necessary to allow some time, after the tracking gate 17, for the radar 28 to recover. For this reason, a suitable recovery time offset 30 may be provided in the time interval between the tracking and data gates 17 and 22 respectively. In addition, a period of time 31 equal to one-half the radar pulse length should be left behind the tracking gate 17, since the signal appearing at the front of the data gate 22 is made up of contributions from reflectors a distance equal to one-half the pulse length times the speed of light, in front of the data gate 22. Both of these time factors 30 and 31, as well as safety factor 27, may be accounted for by proper adjustment of the delay within the pulse generating circuitry 16 of FIG. 1.

Inasmuch as the method and apparatus of the present invention are to provide as close to simultaneous sampling, as possible, by the radar 28 and meteorological sensing equipment aboard the aircraft 26, it is necessary to consider both the instantaneous difference in the positions of the aircraft 26 and the radar sampled volume 29 and the time history of their positions during aircraft flight. In general, the track of both the aircraft 26 and the radar sampled volume 29 is calculated and comparision between the meteorological and atmospheric radar data is made on the basis of position. For simple aircraft patterns, such as a constant altitude, radial course relative to the radar 28, a simple comparison of the radar and meteorological data on a basis of time should be sufficient. In such a case, the spatial offsets $\Delta x$ and $\Delta y$ in FIGS. 3 and 4; i.e., the horizontal and vertical differences respectively between the centers of the data and tracking gates 22 and 17, need to be taken into account. It should be obvious from FIG. 3 that, in the early data gate mode, both of these differences are simple trigonometric functions of the lengths of the data gate 22, the safety factor 27, and the tracking gate 17, and the radar elevation angle $\Phi$.

In certain applications of the present invention, the aircraft 26 may pass through the radar sampled atmospheric volume even though the vertical offset $\Delta y$ is several hundred feet. More specifically, as long as the vertical distance $\Delta h$, from the center to the uppermost edge of the sampled volume 29 in FIG. 3, is larger than $\Delta y$, the aircraft 26 will pass through some portion of the sampled volume 29 with some time delay. This time delay is determined by the volume of the horizontal offset $\Delta x$ and the speed of the aircraft 26, assuming an essentially horizontal and radial flight path. The quantity $\Delta h$ is a function of the radar beamwidth $\beta$, the length of the data gate 22 and the safety factor 27, the range of the aircraft 26 (the center of the tracking gate 17) and the elevation angle $\Phi$. In the late data gate mode illustrated in FIG. 4, the spatial offsets $\Delta x$ and $\Delta y$ are obviously greater than in the early data gate mode, due to the inclusion of the time offsets 30 and 31 as previously discussed.

Many modifications, adaptations and alterations of the present invention are possible in light of the above teachings. Therefore, within the spirit and scope of the appended claims, it should be understood that the invention may be practiced otherwise than as specifically described hereinabove.

I claim:

1. A method for simultaneously sampling a volume of the atmosphere by radar and airborne meteorological sensors, comprising the steps of, sampling the atmosphere with meteorological sensors mounted aboard an aircraft, continuously tracking said aircraft with a radar tracking gate, and sampling the atmospheric radar returns with a radar data gate offset by a known predetermined amount of time from said tracking gate.

2. The method specified in claim 1 wherein said data gate is offset to sample the atmospheric radar returns ahead of the aircraft tracking gate in time.

3. The method specified in claim 1 wherein said data gate is offset to sample the atmospheric radar returns behind the aircraft tracking gate in time.

4. The method specified in claim 1 wherein the time offset between said tracking and data gates is variable.

5. The method specified in claim 1 further including the step of selecting the time offset between said tracking and data gates to be sufficient such that the aircraft does not contribute to the radar returns being sampled by said data gate.

6. In a system for simultaneously sampling a volume of atmosphere with radar and meteorological sensors, the combination comprising, an aircraft equipped with meteorological sensor means for sampling the surrounding atmosphere during flight of said aircraft, and a radar system including, means for generating a tracking gate effective to continuously track the position of said aircraft during flight, and means for generating a data gate offset by a predetermined amount of time from said tracking gate effective to cause said radar system to sample the radar returns from a volume of atmosphere spaced from said aircraft.

7. The combination specified in claim 6 and further including means for adjusting the time offset between said tracking gate and said data gate.

8. The combination specified in claim 6 wherein said radar system comprises, a transmitter means effective to transmit electromagnetic pulses and a receiver means effective to receive said electromagnetic pulses after reflection and convert then into output video signals, timing pulse generator means operably connected to said transmitter means for generating master radar trigger pulses effective to cause the transmission of electromagnetic pulses towards said aircraft, range unit means operably connected to receive the video output signals from said receiver means and said master radar trigger pulses for producing a tracking gate signal and a prerange trigger signal offset by a predetermined fixed time interval ahead of said tracking gate signal, said tracking gate signal being effective to control said radar system to continuously track the position of said aircraft during flight, pulse generating means operably connected to receive said prerange trigger signal and generate a data gate signal offset by a predetermined amount of time from said tracking gate signal, sample and hold means operably connected to receive the video output signal from said receiver means and controlled by said data gate signal to sample and hold said video output signal, and recorder means operably connected to monitor said sample and hold means.

9. The system specified in claim 8 wherein said pulse generating means has an adjustable delay for varying the time offset between said tracking and data gates.

10. The system specified in claim 8 wherein said pulse generating means is effective to selectively generate said data gate either before or after said tracking gate in time.